Patented Mar. 15, 1932

1,849,192

UNITED STATES PATENT OFFICE

IGNAZ KREIDL, OF VIENNA, AUSTRIA

OPACIFYING SUBSTANCE FOR ENAMELS, GLASSES, AND THE LIKE

No Drawing. Application filed December 20, 1927, Serial No. 241,464, and in Austria January 4, 1927.

This invention relates to an opacifier for enamels, glasses and the like, which consists essentially of synthetically produced aluminium alkali silicates or aluminium alkaline earth silicates. For the production of these opacifiers use may be made of natural, non-opacifying aluminium silicates (clays) or double silicates or also synthetically produced aluminium silicates. Those aluminium alkali silicates or aluminium alkaline earth silicates, in which the proportion of $SiO_2$ : metallic oxide = 2 : 1 are preferable as opacifiers.

The alkali or alkaline earth is preferably introduced into the aluminium silicate compound in the proportion most favourable for opacifying, that is to say, for two molecules $SiO_2$ one molecule metallic oxide. In this proportion the metallic oxide enters into the compound and directly produces the opacifying agent. The opacifying power of the products obtained in this way is extremely great.

The alkali or alkaline earth may be introduced into the aluminium silicate compound by treating the latter with oxides, hydroxides, carbonates and the like of the alkalies or alkaline earths or mixtures thereof.

When use is made of caustic alkalies, the combining can be effected by boiling the alkali solution with the clays or artificially prepared products; when carbonates are used preferably by fusing together.

Example

Kaolin is introduced while stirring, into a boiling 30% solution of caustic soda, the amount of caustic soda to be employed being so calculated that one molecule $Na_2O$ corresponds to two molecules $SiO_2$. In this exothermic process, the $Na_2O$ enters into the kaolin, while the water of the caustic soda solution is evaporated. The reaction product obtained in this way, if not sufficiently dry, is dried. In this drying the reaction product may also be exposed to increased temperatures, in which case however temperatures should be avoided which are higher than the usual annealing temperatures of the enamels, i. e. about 800° C. At temperatures higher than these, the physical properties (colloid) of the product, characteristic for opacifying purposes, are not present.

What I claim is:

1. An enamel containing an opacifier comprising a silico-aluminate compound of an alkali-forming metal derived from the treatment of kaolin with an alkali-forming metal oxide and wherein the aluminium oxide and the silicic acid are present substantially in the same proportion as in the kaolin.

2. An enamel containing an opacifier comprising a silico-aluminate compound of an alkali-forming metal derived from the treatment of kaolin with an alkali oxide and wherein the aluminium oxide and the silicic acid are present substantially in the same proportions as in the kaolin.

3. An enamel containing an opacifier comprising a silico-aluminate compound of an alkali-forming metal derived from the treatment of clay with an alkali-forming metal oxide, and wherein the aluminium oxide and the silicic acid constituents are present substantially in the same proportions as in the clay.

4. An enamel containing an opacifier comprising a silico-aluminate compound of an alkali-forming metal derived from the treatment of clay with an alkali oxide and wherein the aluminium oxide and the silicic acid constituents are present substantially in the same proportions as in the clay.

In witness whereof I have hereunto signed my name.

DR. IGNAZ KREIDL.